United States Patent [19]

Bertelli et al.

[11] 4,010,139

[45] Mar. 1, 1977

[54] SELF-EXTINGUISHING POLYOLEFINIC COMPOSITIONS

[75] Inventors: Guido Bertelli; Pierpaolo Roma, both of Ferrara, Italy

[73] Assignee: Montedison Fibre S.p.A., Milan, Italy

[22] Filed: Oct. 24, 1975

[21] Appl. No.: 625,771

[30] Foreign Application Priority Data

Oct. 28, 1974  Italy .................................. 28851/74
Aug. 11, 1975  Italy .................................. 26281/75
Aug. 11, 1975  Italy .................................. 26280/75

[52] U.S. Cl. ............................ 428/35; 260/45.7 R; 260/45.8 A; 260/45.75 B; 260/28.5 A; 260/897 C; 260/873
[51] Int. Cl.² ........................ C08K 3/26; C08K 5/56
[58] Field of Search ............. 260/45.7 R, 45.75 B, 260/897 C, 873, 45.95 B, 28.5 A, 45.8 A

[56] References Cited

UNITED STATES PATENTS

| | | | |
|---|---|---|---|
| 3,025,262 | 3/1962 | Peters et al. ................. | 260/45.75 B |
| 3,239,482 | 3/1966 | Rapp ............................ | 260/45.75 B |
| 3,385,819 | 5/1968 | Gouinlock ................... | 260/45.75 B |
| 3,519,697 | 7/1970 | Price et al. ................... | 260/45.75 B |
| 3,899,463 | 8/1975 | Newcombe ................... | 260/45.75 B |

*Primary Examiner*—V. P. Hoke
*Attorney, Agent, or Firm*—Morgan, Finnegan, Pine, Foley & Lee

[57] ABSTRACT

The present invention relates to new polyolefinic compositions suited for producing self-extinguishing articles.

10 Claims, No Drawings

SELF-EXTINGUISHING POLYOLEFINIC COMPOSITIONS

More particularly, this invention concerns compositions consisting of polymers or copolymers of ethylene and/or alphaolefins or of polymers of styrene containing special flame-extinguishing agents.

The polyolefinic compositions of this invention comprise (1) a polyolefin selected from group consisting of polymers and copolymers of ethylene and/or alpha-olefins and styrene polymers; (2) a mixture of (a) a bismuth compound selected from the group consisting of $Bi_2O_3$, $Bi_2S_3$, inorganic and organic compounds of the type $BiR_3$, wherein R is selected from the group consisting of an alkyl group with 1–20 carbon atoms and aryl groups; and (b) a partially halogenated compound, thermically unstable, which on heating decomposes with formation of the corresponding hydrogen halide; component (a) being present in such an amount as to have a bismuth content in the composition lower than 5% by weight, and more particularly comprised between 0.5% and 3% by weight, while component (b) is present in an amount comprised between 1% and 10% by weight of the composition.

BACKGROUND OF THE INVENTION

Various processes useful for rendering polyolefinic polymers flame-proof are already known from the art. These processes are based essentially on the addition to the polymers of thermically unstable halogenated compounds that in the presence of heat decompose to form the corresponding hydrogen halide, i.e., hydrochloric or hydrobromic acid. Examples of such halogenated compounds used in the prior art are: chlorinated paraffin waxes containing from 40% to 75% of chlorine and chlorinated or brominated phenols.

When halogenated compounds of the type of the aforesaid chlorinated paraffin waxes or of the type of the chlorinated or brominated phenols are added to polyethylene or polypropylene, the polymer combustibility undergoes a reduction that depends on the amount of halogen present in the polymer. To achieve a satisfactory degree of uninflammability, however, very high amounts of halogenated compounds, in general higher than 30% by weight with respect to the polymer, are required.

It is also known in the prior art that the amount of halogenated flame-extinguishing additive may be reduced if there is also incorporated in the polymer an oxygenated antimony compond of the type of antimony trioxide or antimony oxyhalides.

Although the antimony trioxide and halogenated paraffin combination yields satisfactory results as far as the self-extinguishing properties they impart to the polymers are concerned, nevertheless, they are not free from rather serious drawbacks. In fact, antimony trioxide must be added to the polymer in amounts higher than 10% by weight and halogenated paraffin in an amount of 15–30% by weight, so that the total additive amount (antimony compotnd and halogenated paraffin) turns out to be generally comprised between 30% and 35% by weight with respect to the polymer. This causes a strong deterioration of the polymer's mechanical properties (breaking load, yield strength, hardness, resilience), a corrosion of the equipment in which the treatment of materials is carried out, and finally a strong development of toxic smokes and gases in case of fire.

GENERAL DESCRIPTION OF INVENTION

It has now been found, and this forms the object of this invention, that it is possible to prepare self-extinguishing compositions based on polymers and ocpolymers of ethylene and/or alpha-olefins or of styrene polymers starting from mixtures of these substances with a mixture of:

a. a bismuth compound selected from the group consisting of $Bi_2O_3$, $Bi_2S_3$, inorganic and organic oxygenated and non-oxygenated bismuth salts, and metal organic compounds of the type $BiR_3$, wherein R is selected from the group consisting of an alkyl group with 1–20 carbon atoms and aryl groups; and (b) a partially halogenated compound, thermically unstable, which on heating decomposes with formation of the corresponding hydrogen halide; component (a) being present in such an amount as to have a bismuth content in the composition lower than 5% by weight, and more particularly comprised between 0.5% and 3% by weight, while component (b) is present in an amount comprised between 1% and 10% by weight of the composition.

Typical bismuth compounds useful in this invention are the following bismuth salts: BiOCl, $Bi(NO_3)_3 \cdot 5H_2O$, $(BiO)NO_3$, $Bi_2(SO_4)_3$, $(BiO)_2SO_4$, $BiPO_4$, $(BiO)_2CO_3$ occurring in nature as bismutite, $(CH_3COO)_3Bi$, basic bismuth salicylate which is a hydrosoluble salt of variable composition (which is obtained by adding a solution of sodium salicylate to a solution of bismuth nitrate), bismuth tellurate, bismuth titanate, bismuth halides, bismuth sulphocyanate, bismuth carbamates such as for instance dimethyl-dithiocarbamate.

A compound typical of those of the type $BiR_3$ is triphenylbismuthine.

The preferred compound is the basic carbonate ($(BiO)_2CO_3$ in the anhydrous state (bismutite) both for economical reasons as well as for the high degree of self-extinguishing capacity that it confers to the polyolefins.

Amongst the partially halogenated compounds capable of breaking down in the presence of heat to form the corresponding halogen halide are: chlorinated paraffin waxes containing from 40–75% by weight of chlorine, chlorinated propylene, chlorinated naphthalenes, chlorinated indenes, chlorinated polyphenyls such as chlorinated terphenyl, tetrachlorophthalic acid anhydride, chlorinated polyphenols such as tetrachlorinated bisphenol A, chlorinated polymers such as polyvinyl chloride, polyvinylidene chloride, chlorinated polyester resins and chlorinated rubbers.

The bismuth compounds are used in such amounts as to have a bismuth content in the polyolefinic composition lower than 5% by weight, and more particularly comprised between 0.5% and 3% by weight. The partially halogenated compounds are used in a quantity comprised between 1% and 10%, preferably between 3% and 6% by weight with respect to the mixture.

It is also possible to impart self-extinguishing properties to the polyolefins by addition of the reaction product between the bismuth compound and the partially halogenated compound. In this case the two compounds are made to react in quantities corresponding to the aforesaid by weight percentages. The use of reaction products between Bi-halides or metal organic compounds of the type $BiR_3$ and a partially halogenated compound has already been described in Italian patent application Ser. No. 25928 filed Aug. 2, 74.

The composition however obtained are extruded in conventional extruders in order to obtain a granular product to be used in the production of self-extinguishing articles, or they can be employed for manufacturing molded articles without preliminary granulation.

As polyolefins may be used: high or low density polyethylene, isotactic or predominantly isotactic polypropylene, optionally modified with small percentages of polymerized ethylene, elastomeric ethylene-propylene copolymers, and styrene polymers.

SPECIFIC DESCRIPTION OF THE INVENTION

The following examples are given for merely illustrative and not limiting purposes.

EXAMPLES 1–18

The powdery ingredients (polyolefin, bismuth compound and partially halogenated compound), weighted beforehand, were mixed in the dry state in a 1 liter rotating glass flask in a nitrogen atmosphere, at room temperature.

The thus obtained mix was then extruded in a DOLCI type extruder (screw diameter = 20 mm; length/diameter ratio = 23; rotational speed = 20 rev./min.) at a temperature of 190° C., in order to obtain a granulated product which is subsequently used for preparing 3 mm. thick laminae by means of a small CARVER type press.

| Molding temperature | 180° C. |
|---|---|
| Pressure | 2 kg/sq.cm |
| Molding time | 7 min. |

On the laminae thus prepared was determined the self-extinguishing capacity by measuring the oxygen index, according to ASTM standards D-2863, which expresses the minimum percentage of oxygen in an oxygen/nitrogen mixture, necessary for the test sample to burn in a continuous manner.

The tests were carried out using as a polyolefin a polypropylene having an isotacticity index of 95, as a partially halogenated compound CERECLOR 70 (a chlorinated paraffin by ICI, with 70% of Cl), and as bismuth compounds those reported in TABLE I.

The laminae of which was determined the oxygen index were prepared starting from 200 grams of a mixture of:

| The laminae of which was determined the oxygen index were prepared starting from 200 grams of a mixture of: | |
|---|---|
| CERECLOR 70 | 10 grams | compound of bismuth in an amount corresponding to 1.35% of bismuth in the mixture, and the remainder of polypropylene.

The results of the tests with the different bismuth compounds have been recorded on TABLE I.

TABLE I

| Example n° | Bismuth compound | Oxygen Index |
|---|---|---|
| 1 | BiNO$_3$.5H$_2$O | 18 |
| 2 | BiPO$_4$ | 19 |
| 3 | Tellurate | 19 |
| 4 | BiOCl | 20 |

TABLE I-continued

| Example n° | Bismuth compound | Oxygen Index |
|---|---|---|
| 5 | Bi$_2$O$_3$ | 24.5 |
| 6 | Basic acetate | 25 |
| 7 | (BiO)NO$_3$ | 25.5 |
| 8 | Titanate | 25.5 |
| 9 | Basic salicylate | 26 |
| 10 | (BiO)$_2$CO$_3$ | 29 |
| 11 | BiCl$_3$ | 27.5 |
| 12 | BiJ$_3$ | 26.5 |
| 13 | BiF$_3$ | 21 |
| 14 | BiBr$_3$ | 27.5 |
| 15 | Bi(SCN)$_3$ | 22.5 |
| 16 | Bi$_2$S$_3$ | 23.5 |
| 17 | Bi(C$_6$H$_5$)$_3$ | 27.5 |
| 18 | Dimethyl-di-thio-carbamate | 21.5 |

Remark: for the polypropylene as such oxygen index is 17.

EXAMPLE n° 19:

Into a rotating 0.5 liters glass flask were introduced 50 g. of CERECLOR 70 and 10 g. of (BiO)$_2$CO$_3$ and this mixture was heated in an oil bath maintained at 180° C. From the flask were given off acidic vapors which, dragged along by a nitrogen flow, caused the clouding of a barium hydroxide solution. When, after 2 hours, the gaseous current did not cloud the barium hydroxide solution anymore, the heating was interrupted and the flask was left to cool down to room temperature.

Thereupon 6 g. of the solid reaction product were ground and admixed to 94 g. of polypropylene having an isotacticity index of 95, following the same procedures as those of examples 1–18. After extrusion and molding, as already described, laminae were obtained which showed an oxygen index of 28.5.

EXAMPLES nos.° 20–22:

There were followed the same procedures already described in examples from 1 to 18, with the difference that polystyrene was used instead of polypropylene, and that the molding temperature was 160° C. instead of 180° C.

The tests were carried out using as a bismuth compound the basic carbonate (BiO)$_2$CO$_3$ and as partially halogenated compounds Citex BC 26 (an aliphatic chloro-brominated compound containing 40% of Cl and 29% of Br, produced by CITIES SERVICE CO.), Flammex 5 BP (pentabromophenol produced by BERK Ltd. Corp.) and Cereclor 70 (a chlorinated paraffin with a 70% content of Cl, produced by ICI).

The results of said tests have been recorded on TABLE II.

TABLE II

| Example n°: | 20 | 21 | 22 |
|---|---|---|---|
| Polystyrene | 93% | 93% | 94% |
| (BiO)$_2$CO$_3$ | 2% | 2% | 1% |
| Citex BC 26 | 5% | — | — |
| Cereclor 70 | — | 5% | — |
| Flammex 5BP | — | — | 5% |
| Oxygen index | 24.5 | 22.5 | 26 |

Remark: for the polystyrene as such the oxygen index is 18.

We claim:
1. Polyolefinic compositions suited for the manufacture of self-extinguishing articles, comprising:
   1. a polyolefin selected from the group consisting of homopolymers and copolymers of ethylene, alpha olefins and styrene; and

2. a mixture of:
   a. a bismuth compound selected from the group consisting of basic bismuth carbonate and triphenyl-bismuthine; and
   b. a partially halogenated compound, thermically unstable, which on heating decomposes with the formation of the corresponding hydrogen halide; component (a) being present in such an amount as to have a bismuth content in the composition lower than 5% by weight, while component (b) is present in an amount comprised between 1% and 10% by weight of the composition.

2. Compositions according to claim 1 in which the polyolefin is isotactic or predominantly isotactic polypropylene.

3. Compositions according to or anyone claim 1 in which the polyolefin is polystyrene.

4. Manufactured articles, such as granules, pipes and other molded articles, obtained starting from the polyolefinic compositions according to claim 1.

5. Polyolefin compositions suited for the manufacture of self-extinguishing articles comprising:
   1. a polyolefin selected from the group consisting of homopolymers and copolymers of ethylene, alpha olefins and styrene; and
   2. the reaction product between:
      a. basic bismuth carbonate; and,
      b. a partially halogenated compound thermally unstable, which on heating decomposes with formation of the corresponding hydrogen halide; component (a) being present in such an amount as to have a bismuth content in the composition lower than 5% by weight, while component (b) is present in an amount comprised between 1% and 10% by weight of the composition.

6. Compositions according to claim 5 in which the polyolefin is isotactic or predominantly isotactic polypropylene.

7. Compositions according to claim 5 in which the polyolefin is polystyrene.

8. Manufactured articles, such as granules, pipes and other molded articles, obtained starting from the polyolefinic compositions according to claim 5.

9. Compositions according to claim 1 in which component (a) is present in such an amount as to provide a bismuth content in the composition of between 0.5 and 3% by weight.

10. Compositions according to claim 5 in which component (a) is present in such an amount as to provide a bismuth content in the composition of between 0.5 and 3% by weight.

* * * * *

UNITED STATES PATENT AND TRADEMARK OFFICE
CERTIFICATE OF CORRECTION

PATENT NO. : 4,010,139
DATED : March 1, 1977
INVENTOR(S) : Guido Bertelli and Pierpaolo Roma It is certified that error appears in the above-identified patent and that said Letters Patent are hereby corrected as shown below:

On the title page, in the first column, Item 73, the name of the assignee should read -- Montedison S.p.A. --.

In Col. 5, line 16, the words "or anyone" should be deleted.

Signed and Sealed this second Day of August 1977

[SEAL]

Attest:

RUTH C. MASON
*Attesting Officer*

C. MARSHALL DANN
*Commissioner of Patents and Trademarks*